US011887523B2

(12) United States Patent
Park et al.

(10) Patent No.: US 11,887,523 B2
(45) Date of Patent: Jan. 30, 2024

(54) DISPLAY APPARATUS AND METHOD OF DRIVING THE SAME

(71) Applicant: Samsung Display Co., Ltd., Yongin-si (KR)

(72) Inventors: Sehyuk Park, Seongnam-si (KR); Hyo Jin Lee, Yongin-si (KR); Sangan Kwon, Cheonan-si (KR); Jinyoung Roh, Hwaseong-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 16/844,887

(22) Filed: Apr. 9, 2020

(65) Prior Publication Data

US 2020/0349879 A1 Nov. 5, 2020

(30) Foreign Application Priority Data

May 2, 2019 (KR) ........................ 10-2019-0051854

(51) Int. Cl.
*G09G 3/20* (2006.01)
*G09G 3/3266* (2016.01)
*G09G 3/3275* (2016.01)

(52) U.S. Cl.
CPC ......... *G09G 3/2007* (2013.01); *G09G 3/3266* (2013.01); *G09G 3/3275* (2013.01); *G09G 2320/0247* (2013.01)

(58) Field of Classification Search
CPC .. G09G 3/2007; G09G 3/3266; G09G 3/3275; G09G 2320/0247
USPC .......................................................... 345/691
See application file for complete search history.

(56) References Cited

U.S. PATENT DOCUMENTS

| | | | | |
|---|---|---|---|---|
| 9,530,380 | B2 | 12/2016 | Jang et al. | |
| 9,653,029 | B2 | 5/2017 | Wang et al. | |
| 2010/0171776 | A1 * | 7/2010 | Yamagata | G09G 3/3406 345/691 |
| 2010/0328535 | A1 * | 12/2010 | Okui | G09G 3/20 348/E9.055 |
| 2014/0062326 | A1 | 3/2014 | Ahn et al. | |

(Continued)

FOREIGN PATENT DOCUMENTS

| | | | |
|---|---|---|---|
| EP | 3 264 408 A2 | 1/2018 | |
| KR | 10-2014-0039524 A | 4/2014 | |

(Continued)

*Primary Examiner* — Amare Mengistu
*Assistant Examiner* — Gloryvid Figueroa-Gibson
(74) *Attorney, Agent, or Firm* — Lewis Roca Rothgerber Christie LLP

(57) ABSTRACT

A display apparatus includes: a display panel configured to display an image based on input image data; a gate driver configured to output a gate signal to the display panel; a data driver configured to output a data voltage to the display panel; and a driving controller configured to control an operation of the gate driver and an operation of the data driver, to determine a driving mode of the display apparatus to one of a normal driving mode and a low frequency driving mode based on the input image data, and to determine a driving frequency of the display panel based on the input image data, wherein the driving controller is configured to determine the driving frequency of the display panel using a flicker value varied according to a grayscale value of the input image data and a luminance setting value.

19 Claims, 13 Drawing Sheets

(56) References Cited

U.S. PATENT DOCUMENTS

| | | | | |
|---|---|---|---|---|
| 2014/0085276 | A1 | 3/2014 | Jang et al. | |
| 2016/0093239 | A1 | 3/2016 | Wang et al. | |
| 2016/0284257 | A1 | 9/2016 | Choi | |
| 2017/0018234 | A1* | 1/2017 | Na | G09G 3/3406 |
| 2017/0092178 | A1* | 3/2017 | Lee | G09G 3/2018 |
| 2017/0092191 | A1 | 3/2017 | An et al. | |
| 2018/0006099 | A1* | 1/2018 | Ka | H01L 27/3262 |
| 2018/0061915 | A1 | 3/2018 | Yu | |
| 2019/0139493 | A1 | 5/2019 | Yim et al. | |

FOREIGN PATENT DOCUMENTS

| | | | |
|---|---|---|---|
| KR | 10-2014-0126149 | A | 10/2014 |
| KR | 10-2015-0094881 | A | 8/2015 |
| KR | 10-2016-0114757 | A | 10/2016 |
| KR | 10-1679360 | B1 | 11/2016 |
| KR | 10-2017-0010175 | A | 1/2017 |
| KR | 10-2018-0025482 | A | 3/2018 |
| KR | 10-2018-0025508 | A | 3/2018 |

* cited by examiner

FIG. 3

| GRAYSCALE | FLICKER LUT | DRIVING FREQUENCY |
|---|---|---|
| 0-7 | 0 | 1Hz |
| 8-15 | 1 | 30Hz |
| 16-19 | 2 | 10Hz |
| 20-27 | 3 | 2Hz |
| 28-255 | 0 | 1Hz |

FIG. 4

| GRAYSCALE | FLICKER LUT | DRIVING FREQUENCY |
|---|---|---|
| 0-10 | 0 | 1Hz |
| 11-21 | 1 | 30Hz |
| 22-26 | 2 | 10Hz |
| 27-37 | 3 | 2Hz |
| 38-255 | 0 | 1Hz |

FIG. 8

| DBV | MAX LUMINANCE |
| --- | --- |
| 2047 | 1000 |
| 1623 | 600 |
| 1184 | 300 |
| 719 | 100 |
| 570 | 60 |
| 416 | 30 |
| 303 | 15 |
| 215 | 7 |
| 166 | 4 |
| 121 | 2 |

FIG. 9

| GRAYSCALE | FLICKER LUT | DRIVING FREQUENCY |
|---|---|---|
| 0 | 0 | 1Hz |
| 1 | 0 | 1Hz |
| 2 | 1 | 30Hz |
| 3 | 1 | 30Hz |
| 4 | 2 | 10Hz |
| 5 | 3 | 2Hz |
| ⋮ | ⋮ | ⋮ |
| 254 | 0 | 1Hz |
| 255 | 0 | 1Hz |

FIG. 10

| LUMINANCE | FLICKER LUT | DRIVING FREQUENCY |
|---|---|---|
| 0.03 | 0 | 1Hz |
| 0.22 | 0 | 1Hz |
| 0.59 | 1 | 30Hz |
| 1.18 | 1 | 30Hz |
| 1.98 | 2 | 10Hz |
| 3.02 | 3 | 2Hz |
| ⋮ | ⋮ | ⋮ |
| 599 | 0 | 1Hz |
| 600 | 0 | 1Hz |

DISPLAY APPARATUS AND METHOD OF DRIVING THE SAME

CROSS-REFERENCE TO RELATED APPLICATION

The present application claims priority to and the benefit of Korean Patent Application No. 10-2019-0051854, filed on May 2, 2019 in the Korean Intellectual Property Office KIPO, the content of which is incorporated herein incorporated by reference in its entirety.

BACKGROUND

1. Field

Aspects of some example embodiments of the present inventive concept relate to a display apparatus and a method of driving the display apparatus.

2. Description of the Related Art

A display apparatus includes a display panel and a display panel driver. The display panel includes a plurality of gate lines, a plurality of data lines, and a plurality of pixels. The display panel driver includes a gate driver, a data driver, and a driving controller. The gate driver outputs gate signals to the gate lines. The data driver outputs data voltages to the data lines. The driving controller controls the gate driver and the data driver.

The driving controller may determine a driving frequency of the display panel according to input image data. In a low frequency driving mode, a flicker of an image may be perceived to a user.

The above information disclosed in this Background section is only for enhancement of understanding of the background and therefore the information discussed in this Background section does not necessarily constitute prior art.

SUMMARY

Aspects of some example embodiments of the present inventive concept relate to a display apparatus and a method of driving the display apparatus. For example, some example embodiments of the present inventive concept relate to a display apparatus that may be capable of preventing or reducing a flicker in a low frequency driving method and a method of driving the display apparatus.

Aspects of some example embodiments of the present inventive concept may include a display apparatus configured to determine a driving frequency of a display panel based on a grayscale value of input image data and a luminance setting value to enhance a display quality.

Aspects of some example embodiments of the present inventive concept may also include a method of driving the above-mentioned display apparatus.

According to some example embodiments of a display apparatus according to the present inventive concept, the display apparatus includes a display panel, a gate driver, a data driver, and a driving controller. The display panel is configured to display an image based on input image data. The gate driver is configured to output a gate signal to the display panel. The data driver is configured to output a data voltage to the display panel. The driving controller is configured to control an operation of the gate driver and an operation of the data driver, to determine a driving mode of the display apparatus to one of a normal driving mode and a low frequency driving mode based on the input image data, and to determine a driving frequency of the display panel based on the input image data. The driving controller is configured to determine the driving frequency of the display panel using a flicker value varied according to a grayscale value of the input image data and a luminance setting value.

According to some example embodiments, the driving controller may include a static image determiner configured to determine whether the input image data is a static image or a video image, and to generate a flag representing whether the input image data is the static image or the video image, a flicker lookup table configured to store the flicker value and a driving frequency determiner configured to determine the normal driving mode and the low frequency driving mode based on the flag and to determine the driving frequency of the display panel using the flicker lookup table.

According to some example embodiments, the flicker lookup table may be configured to store the grayscale value of the input image data and the flicker value for determining the driving frequency of the display panel and corresponding to the grayscale value.

According to some example embodiments, the driving controller may further include a luminance determiner configured to determine whether or not the luminance setting value is equal to a default luminance setting value and a flicker lookup table converter configured to convert the flicker lookup table when the luminance setting value is different from the default luminance setting value.

According to some example embodiments, the flicker lookup table converter may be configured to determine first boundary grayscale values where the flicker value changes, to determine first boundary luminances corresponding to the first boundary grayscale values for the default luminance setting value, and to determine second boundary grayscale values converted from the first boundary grayscale values according to a ratio between the default luminance setting value and the luminance setting value to generate a converted flicker lookup table which is converted from the flicker lookup table.

According to some example embodiments, when the second boundary grayscale value is ng, the first boundary luminance is ol, the luminance setting value is ml, a maximum grayscale value is mg and a gamma value is gm, $ol=(ng/mg)^{gm}*ml$.

According to some example embodiments, the display panel may include a plurality of segments. The driving controller may be configured to determine optimal driving frequencies for the segments and to determine a maximum driving frequency among the optimal driving frequencies for the segments as the driving frequency of the display panel.

According to some example embodiments, the flicker lookup table may be configured to store a grayscale luminance corresponding to the grayscale value of the input image data and the flicker value for determining the driving frequency of the display panel and corresponding to the grayscale luminance.

According to some example embodiments, the driving frequency determiner may be configured to convert the grayscale value of the input image data into the grayscale luminance and to extract the flicker value corresponding to the grayscale luminance from the flicker lookup table to determine the driving frequency.

According to some example embodiments, the display panel may include a plurality of segments. The driving controller may be configured to determine optimal driving frequencies for the segments and to determine a maximum driving frequency among the optimal driving frequencies for the segments as the driving frequency of the display panel.

According to some example embodiments, the luminance setting value may represent a maximum luminance of the image displayed on the display panel.

According to some example embodiments, the display apparatus may further include a host configured to output the input image data and the luminance setting value to the driving controller.

According to some example embodiments, when the driving controller does not receive the luminance setting value from the host, the driving controller may be configured to determine the driving mode of the display apparatus to the normal driving mode.

According to some example embodiments, the display panel may include a switching element of a first type and a switching element of a second type different from the first type.

According to some example embodiments, the driving controller may be configured to determine a driving frequency of the switching element of the first type to a first driving frequency and a driving frequency of the switching element of the second type to a second driving frequency less than the first driving frequency in the low frequency driving mode. The driving controller may be configured to determine the driving frequency of the switching element of the first type to the first driving frequency and the driving frequency of the switching element of the second type to the first driving frequency in the normal driving mode.

According to some example embodiments, the switching element of the first type may be a polysilicon thin film transistor and a P-type transistor. The switching element of the second type may be an oxide thin film transistor and an N-type transistor.

According to some example embodiments of a method of driving a display apparatus according to the present inventive concept, the method includes: determining a driving mode of the display apparatus to one of a normal driving mode and a low frequency driving mode based on input image data, determining a driving frequency of a display panel using a flicker value varied according to a grayscale value of the input image data and a luminance setting value, outputting a gate signal to the display panel and outputting a data voltage to the display panel.

According to some example embodiments, the determining the driving frequency of the display panel may include determining whether or not the luminance setting value is equal to a default luminance setting value and converting a flicker lookup table configured to store the flicker value when the luminance setting value is different from the default luminance setting value.

According to some example embodiments, the converting the flicker lookup table may include determining first boundary grayscale values where the flicker value changes, determining first boundary luminances corresponding to the first boundary grayscale values for the default luminance setting value and determining second boundary grayscale values converted from the first boundary grayscale values according to a ratio between the default luminance setting value and the luminance setting value to generate a converted flicker lookup table which is converted from the flicker lookup table.

According to some example embodiments, a flicker lookup table may be configured to store a grayscale luminance corresponding to the grayscale value of the input image data and the flicker value for determining the driving frequency of the display panel and corresponding to the grayscale luminance. The determining the driving frequency of the display panel may include converting the grayscale value of the input image data into the grayscale luminance and extracting the flicker value corresponding to the grayscale luminance from the flicker lookup table to determine the driving frequency.

According to some example embodiments, in a display apparatus and the method of driving the display apparatus, the driving controller converts the flicker lookup table according to the luminance setting value. Thus, the driving controller may determine the driving frequency of the display panel based on the grayscale value of the input image data and the luminance setting value. Thus, the flicker of the display panel may be prevented or reduced in the low frequency driving mode so that the display quality of the display panel may be enhanced.

BRIEF DESCRIPTION OF THE DRAWINGS

The above and other features and characteristics of the present inventive concept will become more apparent by describing in more detail aspects of some example embodiments thereof with reference to the accompanying drawings, in which:

FIG. 3 is a table illustrating an example flicker lookup table of FIG. 2;

FIG. 4 is a table illustrating a converted flicker lookup table by a flicker lookup table converter of FIG. 2;

FIG. 8 is a table illustrating a maximum luminance of a display panel of the display apparatus of FIG. 7 according to luminance data;

FIG. 9 is a table illustrating an example luminance based flicker lookup table;

FIG. 10 is a table illustrating a converted luminance based flicker lookup table which is converted from the luminance based flicker lookup table of FIG. 9;

DETAILED DESCRIPTION

Hereinafter, the present inventive concept will be explained in more detail with reference to the accompanying drawings.

Figure 1:
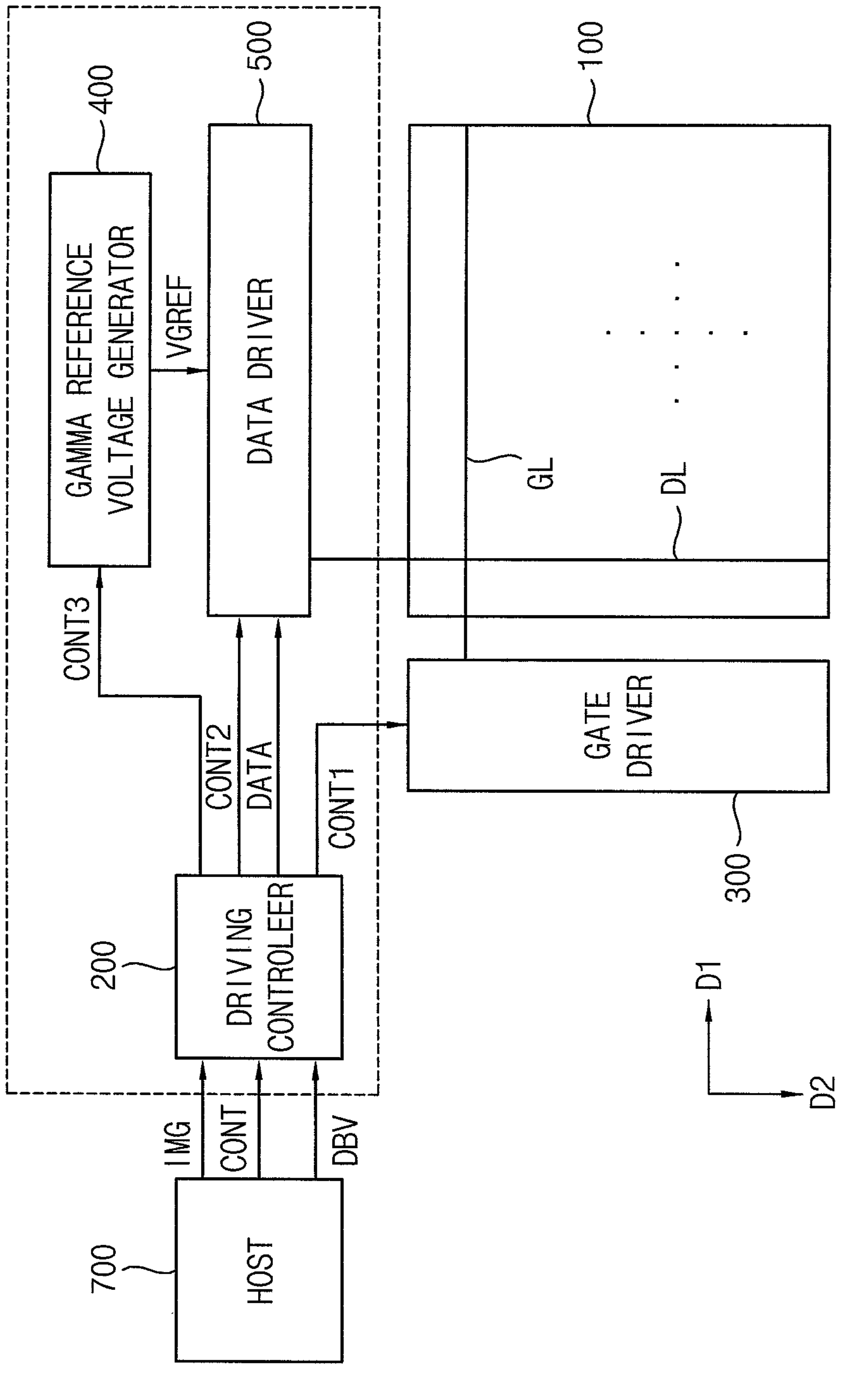
FIG. 1 is a block diagram illustrating a display apparatus according to some example embodiments of the present inventive concept.

FIG. 1 is a block diagram illustrating a display apparatus according to some example embodiments of the present inventive concept.

Referring to FIG. 1, the display apparatus includes a display panel 100 and a display panel driver. The display panel driver includes a driving controller 200, a gate driver 300, a gamma reference voltage generator 400 and a data driver 500. The display apparatus may further include a host 700.

For example, the driving controller 200 and the data driver 500 may be integrally formed. For example, the driving controller 200, the gamma reference voltage generator 400 and the data driver 500 may be integrally formed. A driving module including at least the driving controller 200 and the data driver 500 may be referred to a timing controller embedded data driver (TED).

The display panel 100 includes a display region and a peripheral region adjacent to the display region.

For example, the display panel 100 may be an organic light emitting diode display panel including organic light emitting diodes. Alternatively, the display panel 100 may be a liquid crystal display panel including liquid crystal molecules.

The display panel 100 includes a plurality of gate lines GL, a plurality of data lines DL and a plurality of pixels electrically connected to the gate lines GL and the data lines DL. The gate lines GL extend in a first direction D1 and the data lines DL extend in a second direction D2 crossing the first direction D1.

The driving controller 200 receives input image data IMG and an input control signal CONT from the host 700. The input image data IMG may include red image data, green image data and blue image data. The input image data IMG may include white image data. The input image data IMG may include magenta image data, yellow image data and cyan image data. The input control signal CONT may include a master clock signal and a data enable signal. The input control signal CONT may further include a vertical synchronizing signal and a horizontal synchronizing signal.

The driving controller 200 generates a first control signal CONT1, a second control signal CONT2, a third control signal CONT3 and a data signal DATA based on the input image data IMG and the input control signal CONT.

The driving controller 200 generates the first control signal CONT1 for controlling an operation of the gate driver 300 based on the input control signal CONT, and outputs the first control signal CONT1 to the gate driver 300. The first control signal CONT1 may include a vertical start signal and a gate clock signal.

The driving controller 200 generates the second control signal CONT2 for controlling an operation of the data driver 500 based on the input control signal CONT, and outputs the second control signal CONT2 to the data driver 500. The second control signal CONT2 may include a horizontal start signal and a load signal.

The driving controller 200 generates the data signal DATA based on the input image data IMG. The driving controller 200 outputs the data signal DATA to the data driver 500. According to some example embodiments, the driving controller 200 may compensate the input image data IMG to generate the data signal DATA.

The driving controller 200 generates the third control signal CONT3 for controlling an operation of the gamma reference voltage generator 400 based on the input control signal CONT, and outputs the third control signal CONT3 to the gamma reference voltage generator 400.

The gate driver 300 generates gate signals driving the gate lines GL in response to the first control signal CONT1 received from the driving controller 200. The gate driver 300 outputs the gate signals to the gate lines GL. For example, the gate driver 300 may sequentially output the gate signals to the gate lines GL. For example, the gate driver 300 may be mounted on the display panel 100. For example, the gate driver 300 may be integrated on the display panel 100.

The gamma reference voltage generator 400 generates a gamma reference voltage VGREF in response to the third control signal CONT3 received from the driving controller 200. The gamma reference voltage generator 400 provides the gamma reference voltage VGREF to the data driver 500. The gamma reference voltage VGREF has a value corresponding to a level of the data signal DATA.

According to some example embodiments, the gamma reference voltage generator 400 may be located in the driving controller 200, or in the data driver 500.

The data driver 500 receives the second control signal CONT2 and the data signal DATA from the driving controller 200, and receives the gamma reference voltages VGREF from the gamma reference voltage generator 400. The data driver 500 converts the data signal DATA into data voltages having an analog type using the gamma reference voltages VGREF. The data driver 500 outputs the data voltages to the data lines DL.

The host 700 outputs the input image data IMG and the input control signal CONT to the driving controller 200. The host 700 outputs a luminance setting value DBV representing luminance information of the display panel 100. The luminance setting value DBV may be automatically determined according to an ambient luminance of the display apparatus or set by a user. Alternatively, the luminance setting value DBV may be a dimming information determined based on the input image data IMG. For example, the luminance setting value DBV may represent a maximum luminance of an image displayed on the display panel 100.

Figure 2:
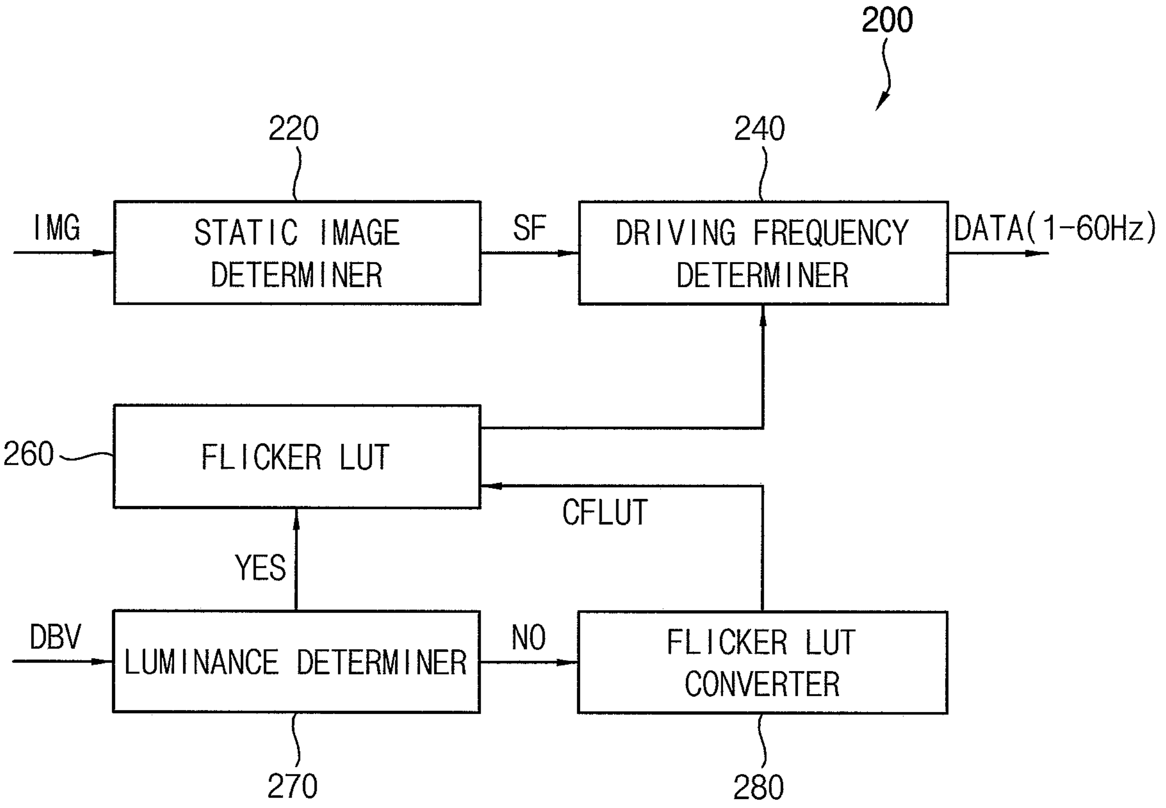
FIG. 2 is a block diagram illustrating a driving controller of FIG. 1.

FIG. 2 is a block diagram illustrating the driving controller 200 of FIG. 1. FIG. 3 is a table illustrating an example flicker lookup table of FIG. 2.

Referring to FIGS. 1 to 3, the display panel 100 may be driven in a normal driving mode and a low frequency driving mode. In the normal driving mode, the display panel 100 may be driven in a normal driving frequency. In the low frequency driving mode, the display panel 100 may be driven in a driving frequency less than the normal driving frequency.

For example, when the input image data represent a video image, the display panel 100 may be driven in the normal driving mode. For example, when the input image data represent a static image, the display panel may be driven in the low frequency driving mode. For example, when the display apparatus is operated in the always on mode, the display panel may be driven in the low frequency driving mode.

For example, when the luminance setting value DBV is not received from the host 700, the driving controller 200 may determine the driving mode of the display apparatus to the normal driving mode.

The driving controller 200 may determine the driving frequency of the display panel 100 using flicker information varied according to the grayscale value of the input image data IMG and the luminance setting value DBV.

The driving controller 200 may include a static image determiner 220, a driving frequency determiner 240 and a flicker lookup table 260.

The static image determiner 220 may determine whether the input image data IMG is a static image or a video image. The static image determiner 220 may output a flag SF representing whether the input image data IMG is the static image or the video image to the driving frequency determiner 240. For example, when the input image data IMG is the static image, the static image determiner 220 may output the flag SF of 1 to the driving frequency determiner 240. When the input image data IMG is the video image, the static image determiner 220 may output the flag SF of 0 to the driving frequency determiner 240. When the display panel 100 is operated in always on mode, the static image determiner 220 may output the flag SF of 1 to the driving frequency determiner 240.

When the flag SF is 1, the driving frequency determiner 240 may drive the display panel 100 in the low frequency driving mode. When the flag SF is 0, the driving frequency determiner 240 may drive the display panel 100 in the normal driving mode.

The driving frequency determiner 240 may refer the flicker lookup table 260 to determine a low driving frequency. The flicker lookup table 260 may include a flicker value according to a grayscale value of the input image data IMG. For example, the flicker lookup table 260 may store a minimum driving frequency in a condition that the difference of the luminance of the writing frame and the luminance of the holding frame does not exceed a just noticeable difference for the grayscale value of the input image data.

The flicker lookup table 260 may store the grayscale value of the input image data IMG and a flicker value corresponding to the grayscale value of the input image data IMG. The flicker value may be for determining the driving frequency of the display panel 100.

In FIG. 3, the flicker lookup table may have a flicker value of 0 for the grayscale values of 0 to 7. Herein the flicker value of 0 may represent the driving frequency of 1 Hz. In FIG. 3, the flicker lookup table may have a flicker value of 1 for the grayscale values of 8 to 15. Herein the flicker value of 1 may represent the driving frequency of 30 Hz. In FIG. 3, the flicker lookup table may have a flicker value of 2 for the grayscale values of 16 to 19. Herein the flicker value of 2 may represent the driving frequency of 10 Hz. In FIG. 3, the flicker lookup table may have a flicker value of 3 for the grayscale values of 20 to 27. Herein the flicker value of 3 may represent the driving frequency of 2 Hz. In FIG. 3, the flicker lookup table may have a flicker value of 0 for the grayscale values of 28 to 255.

According to some example embodiments, the driving controller 200 further includes a luminance determiner 270 and a flicker lookup table converter 280.

The luminance determiner 270 may determine whether or not the luminance setting value DBV is equal to a default luminance setting value. The flicker lookup table 260 may mean a flicker lookup table set for the default luminance setting value of the display apparatus.

When the luminance setting value DBV received from the host 700 is equal to the default luminance setting value, the flicker lookup table 260 is not required to be changed so that the driving frequency of the display panel 100 may be determined using the flicker lookup table 260.

In contrast, when the luminance setting value DBV received from the host 700 is different from the default luminance setting value, the flicker lookup table converter 280 converts the flicker lookup table 260 and generates a converted flicker lookup table CFLUT.

When the flicker lookup table 260 is converted into the converted flicker lookup table CFLUT, the driving frequency determiner 240 may determine the driving frequency of the display panel 100 using the converted flicker lookup table CFLUT.

When the luminance setting value DBV is changed, the luminance of the display panel 100 corresponding to the input image data IMG also changed. The degree of the flicker which is perceived to the user is determined by the luminance but the flicker lookup table 260 is generated according to the grayscale value of the input image data IMG. In this case, the luminance of the display panel 100 is set based on the default luminance setting value.

For example, when the default luminance setting value which represents the maximum luminance of the image displayed on the display panel 100 is 420 nit, the luminance setting value which is set by the user and represents the changed maximum luminance of the image displayed on the display panel 100 is 210 nit and the driving frequency of the display panel 100 is determined by the flicker lookup table 260 which is not converted according to the luminance setting value, the flicker may be generated on the display panel 100.

FIG. 4 is a table illustrating the converted flicker lookup table CFLUT by the flicker lookup table converter 280 of FIG. 2.

Referring to FIGS. 1 to 4, the flicker lookup table converter 280 may determine first boundary grayscale values where the flicker value changes. For example, in FIG. 3, the first boundary grayscale values may include the grayscale value of 8 where the flicker value changes from zero to one, the grayscale value of 16 where the flicker value changes from one to two, the grayscale value of 20 where the flicker value changes from two to three and the grayscale value of 28 where the flicker value changes from three to zero. The flicker lookup table converter 280 may determine first boundary luminances corresponding to the first boundary grayscale values for the default luminance setting value (e.g. 420 nit). For example, the first boundary luminances may include a luminance of 0.21 nit corresponding to the grayscale value of 8, a luminance of 0.95 nit corresponding to the grayscale value of 16, a luminance of 1.55 nit corresponding to the grayscale value of 20 and a luminance of 3.26 nit corresponding to the grayscale value of 28. The flicker lookup table converter 280 may determine second boundary grayscale values converted from the first boundary grayscale values according to a ratio between the default luminance setting value (e.g. 420 nit) and the luminance setting value (e.g. 210 nit) to generate the converted flicker lookup table CFLUT which is converted from the flicker lookup table 260. For example, in FIG. 4, the second boundary grayscale values may include the grayscale value of 11 where the flicker value changes from zero to one, the grayscale value of 22 where the flicker value changes from one to two, the grayscale value of 27 where the flicker value changes from two to three and the grayscale value of 38 where the flicker value changes from three to zero.

When the second boundary grayscale value is ng, the first boundary luminance is ol, the luminance setting value is ml, a maximum grayscale value is mg and a gamma value is gm, the second boundary grayscale value ng of the converted flicker lookup table CFLUT may be determined by following Equation 1. Herein, the gamma value may be 2.2. Alternatively, the gamma value may be set differently.

$$ol=(ng/mg)^{gm}*ml \quad \text{Equation 1}$$

When the luminance setting value is 210 nit in FIG. 4, one of the second boundary grayscale value of 11 where the flicker value changes from zero to one may be determined by following Equation 2. ng in Equation 2 may be about 11.

$$0.21=(ng/255)^{22}*210 \qquad \text{Equation 2}$$

When the luminance setting value is 210 nit in FIG. 4, one of the second boundary grayscale value of 22 where the flicker value changes from one to two may be determined by following Equation 3. ng in Equation 3 may be about 22.

$$0.95=(ng/255)^{22}*210 \qquad \text{Equation 3}$$

When the luminance setting value is 210 nit in FIG. 4, one of the second boundary grayscale value of 27 where the flicker value changes from two to three may be determined by following Equation 4. ng in Equation 4 may be about 27.

$$1.55=(ng/255)^{22}*210 \qquad \text{Equation 4}$$

When the luminance setting value is 210 nit in FIG. 4, one of the second boundary grayscale value of 38 where the flicker value changes from three to zero may be determined by following Equation 5. ng in Equation 5 may be about 38.

$$3.26=(ng/255)^{22}*210 \qquad \text{Equation 5}$$

As explained above, the flicker lookup table 260 of FIG. 3 may be converted into the converted flicker lookup table CFLUT of FIG. 4 and the driving frequency determiner 240 may determine the driving frequency of the display panel 100 in the low frequency driving mode using the converted flicker lookup table CFLUT.

According to some example embodiments, the driving controller 200 converts the flicker lookup table 260 according to the luminance setting value DBV. Thus, the driving controller 200 may determine the driving frequency of the display panel 100 based on the grayscale value of the input image data IMG and the luminance setting value DBV. Thus, the flicker of the display panel 100 may be prevented or reduced in the low frequency driving mode so that the display quality of the display panel 100 may be enhanced.

Figure 5:
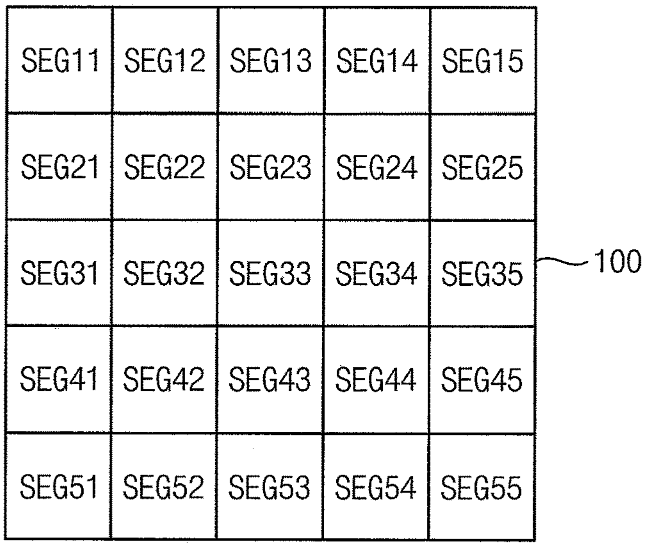
FIG. 5 is a conceptual diagram illustrating a display panel of a display apparatus according to some example embodiments of the present inventive concept.
Figure 6:
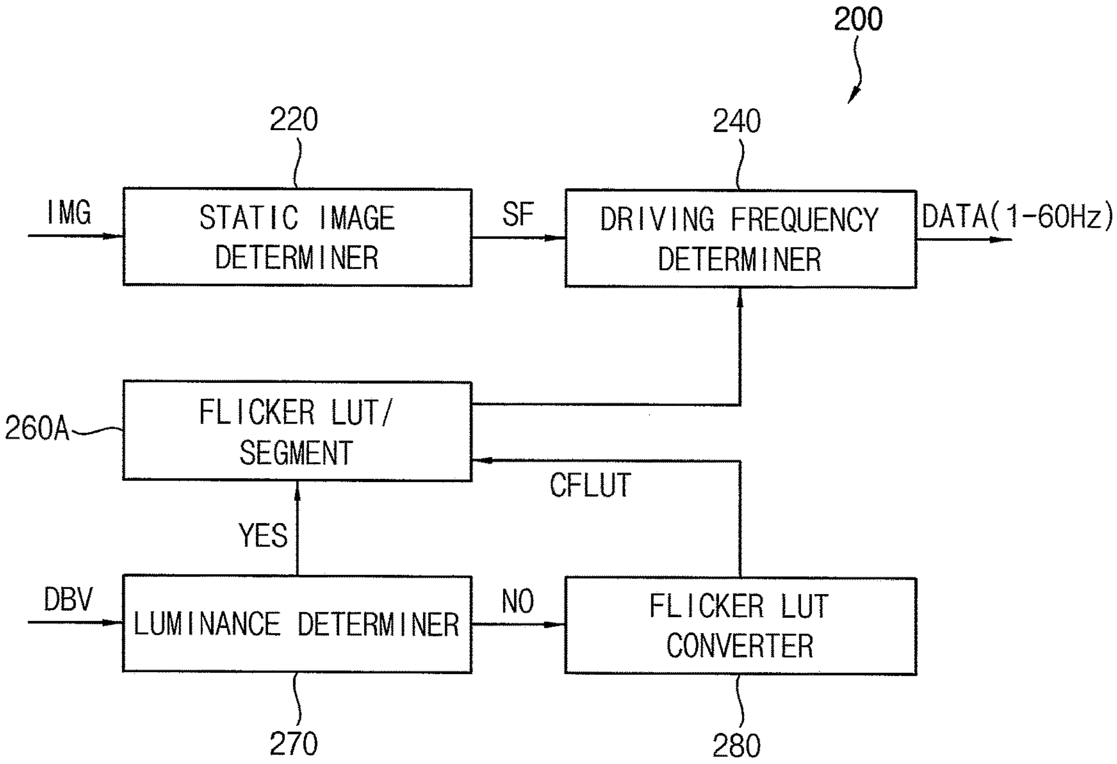
FIG. 6 is a block diagram illustrating a driving controller of the display apparatus of FIG. 5.

FIG. 5 is a conceptual diagram illustrating a display panel of a display apparatus according to some example embodiments of the present inventive concept. FIG. 6 is a block diagram illustrating a driving controller of the display apparatus of FIG. 5.

The display apparatus and the method of driving the display apparatus according to the present example embodiment is substantially the same as the display apparatus and the method of driving the display apparatus of the previous example embodiment explained referring to FIGS. 1 to 4 except that the display panel is divided into a plurality of segments. Thus, the same reference numerals will be used to refer to the same or like parts as those described in the previous example embodiment of FIGS. 1 to 4 and some repetitive explanation concerning the above elements may be omitted.

Referring to FIGS. 1 and 3 to 6, the display apparatus includes a display panel 100 and a display panel driver. The display panel driver includes a driving controller 200, a gate driver 300, a gamma reference voltage generator 400 and a data driver 500. The display apparatus may further include a host 700.

The host 700 outputs the input image data IMG and the input control signal CONT to the driving controller 200. The host 700 outputs a luminance setting value DBV representing luminance information of the display panel 100. The luminance setting value DBV may be automatically determined according to an ambient luminance of the display apparatus or set by a user. Alternatively, the luminance setting value DBV may be a dimming information determined based on the input image data IMG. For example, the luminance setting value DBV may represent a maximum luminance of an image displayed on the display panel 100.

The display panel 100 may include a plurality of segments SEG11 to SEG55. Although the display panel 100 includes the segments in five rows and five columns in the present example embodiment, the present inventive concept is not limited thereto.

When the flicker value is determined for a unit of the pixel and only one pixel has a high flicker value, the entire display panel may be driven in a high driving frequency to prevent or reduce the flicker in the one pixel. For example, when a flicker of only one pixel is prevented or reduced in the driving frequency of 30 Hz and the other pixels do not generate the flicker in the driving frequency of 1 Hz, the display panel 100 may be driven in the driving frequency of 30 Hz and the power consumption of the display apparatus may be higher than necessary.

Thus, when the display panel 100 is divided into the segments and the flicker index is determined for a unit of the segment, the power consumption of the display apparatus may be effectively reduced.

The driving controller 200 may determine the driving frequency of the display panel 100 using flicker information varied according to the grayscale value of the input image data IMG and the luminance setting value DBV.

The driving controller 200 may determine optimal driving frequencies for the segments and may determine the maximum driving frequency among the optimal driving frequencies for the segments as the driving frequency of the display panel 100.

For example, when an optimal driving frequency for a first segment SEG11 is 10 Hz and optimal driving frequencies for the other segments SEG12 to SEG55 except for the first segment SEG11 are 2 Hz, the driving controller 200 may determine the low driving frequency to 10 Hz.

The driving controller 200 may include a static image determiner 220, a driving frequency determiner 240 and a flicker lookup table 260A. According to some example embodiments, the driving controller 200 may further include a luminance determiner 270 and a flicker lookup table converter 280.

The driving frequency determiner 240 may refer the flicker lookup table 260A and segment information to determine the low driving frequency.

When the luminance setting value DBV received from the host 700 is different from the default luminance setting value, the flicker lookup table converter 280 converts the flicker lookup table 260A and generates a converted flicker lookup table CFLUT.

According to some example embodiments, the driving controller 200 converts the flicker lookup table 260A according to the luminance setting value DBV. Thus, the driving controller 200 may determine the driving frequency of the display panel 100 based on the grayscale value of the input image data IMG and the luminance setting value DBV. Thus, the flicker of the display panel 100 may be prevented or reduced in the low frequency driving mode so that the display quality of the display panel 100 may be enhanced.

Figure 7:
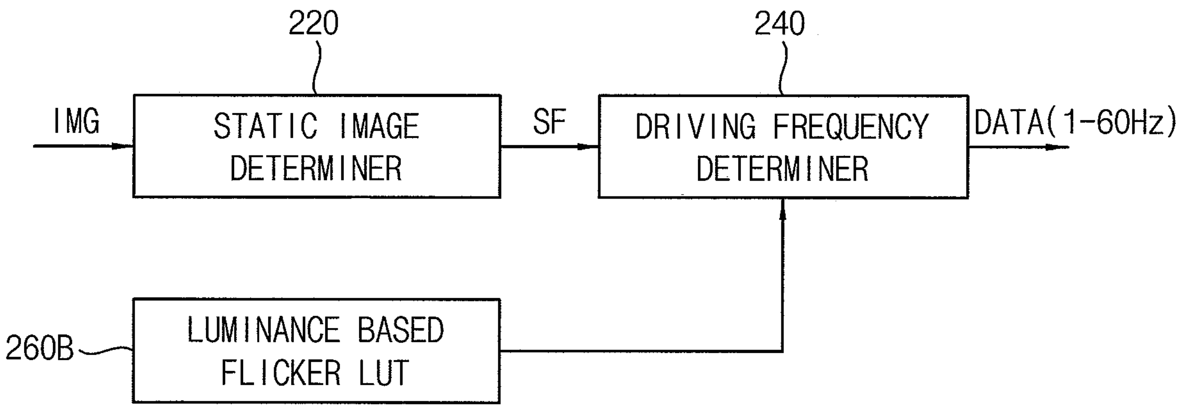
FIG. 7 is a conceptual diagram illustrating a driving controller of a display apparatus according to some example embodiments of the present inventive concept.

FIG. 7 is a conceptual diagram illustrating a driving controller of a display apparatus according to some example embodiments of the present inventive concept. FIG. 8 is a table illustrating a maximum luminance of a display panel of the display apparatus of FIG. 7 according to luminance data. FIG. 9 is a table illustrating an example luminance based flicker lookup table. FIG. 10 is a table illustrating a converted luminance based flicker lookup table which is converted from the luminance based flicker lookup table of FIG. 9.

The display apparatus and the method of driving the display apparatus according to the present example embodiment is substantially the same as the display apparatus and the method of driving the display apparatus of the previous example embodiment explained referring to FIGS. 1 to 4 except that the flicker lookup table is generated not based on the grayscale value but based on the luminance. Thus, the same reference numerals will be used to refer to the same or like parts as those described in the previous example embodiment of FIGS. 1 to 4 and some repetitive explanation concerning the above elements may be omitted.

Referring to FIGS. 1 and 7 to 10 the display apparatus includes a display panel 100 and a display panel driver. The display panel driver includes a driving controller 200, a gate driver 300, a gamma reference voltage generator 400 and a data driver 500. The display apparatus may further include a host 700.

The host 700 outputs the input image data IMG and the input control signal CONT to the driving controller 200. The host 700 outputs a luminance setting value DBV representing luminance information of the display panel 100. The luminance setting value DBV may be automatically determined according to an ambient luminance of the display apparatus or set by a user. Alternatively, the luminance setting value DBV may be a dimming information determined based on the input image data IMG. For example, the luminance setting value DBV may represent a maximum luminance of an image displayed on the display panel 100.

The driving controller 200 may determine the driving frequency of the display panel 100 using flicker information varied according to the grayscale value of the input image data IMG and the luminance setting value DBV.

The driving controller 200 may include a static image determiner 220, a driving frequency determiner 240 and a flicker lookup table 260B.

The static image determiner 220 may determine whether the input image data IMG is a static image or a video image. The static image determiner 220 may output a flag SF representing whether the input image data IMG is the static image or the video image to the driving frequency determiner 240. For example, when the input image data IMG is the static image, the static image determiner 220 may output the flag SF of 1 to the driving frequency determiner 240. When the input image data IMG is the video image, the static image determiner 220 may output the flag SF of 0 to the driving frequency determiner 240. When the display panel 100 is operated in always on mode, the static image determiner 220 may output the flag SF of 1 to the driving frequency determiner 240.

When the flag SF is 1, the driving frequency determiner 240 may drive the display panel 100 in the low frequency driving mode. When the flag SF is 0, the driving frequency determiner 240 may drive the display panel 100 in the normal driving mode.

The driving frequency determiner 240 may refer the flicker lookup table 260B to determine a low driving frequency.

As shown in FIG. 8, when the luminance setting value DBV is 2047, the maximum luminance of an image displayed on the display panel 100 may be 1000 nit, when the luminance setting value DBV is 1623, the maximum luminance of an image displayed on the display panel 100 may be 600 nit, when the luminance setting value DBV is 1184, the maximum luminance of an image displayed on the display panel 100 may be 300 nit, when the luminance setting value DBV is 719, the maximum luminance of an image displayed on the display panel 100 may be 100 nit, when the luminance setting value DBV is 570, the maximum luminance of an image displayed on the display panel 100 may be 60 nit, when the luminance setting value DBV is 416, the maximum luminance of an image displayed on the display panel 100 may be 30 nit, when the luminance setting value DBV is 303, the maximum luminance of an image displayed on the display panel 100 may be 15 nit, when the luminance setting value DBV is 215, the maximum luminance of an image displayed on the display panel 100 may be 7 nit, when the luminance setting value DBV is 166, the maximum luminance of an image displayed on the display panel 100 may be 4 nit, and when the luminance setting value DBV is 121, the maximum luminance of an image displayed on the display panel 100 may be 2 nit.

The maximum luminance information according to the luminance setting value DBV may be stored in the driving controller 200. When the luminance setting value DBV is transmitted from the host 700 to the driving controller 200, the driving controller 200 may determine the maximum luminance according to the luminance setting value DBV.

In FIG. 8, ten representative maximum luminances according to ten representative luminance setting values DBV may be stored. When the luminance setting values DBV which is not included in the ten representative luminance setting values DBV is inputted to the driving controller 200, the driving controller 200 may determine the maximum luminance by interpolation of the adjacent representative maximum luminances corresponding to the adjacent representative luminance setting values DBV.

For example, when the luminance setting value DBV is 520, the maximum luminance may be determined as 50.26 by following Equation 6.

$$(60-30)*(520-416)/(570-416)+30=50.26 \quad \text{Equation 6}$$

Using the maximum luminance, luminance for each grayscale value may be obtained. When the maximum luminance is MaxL, luminance for a grayscale value is GrayL, the gamma value is gm, the maximum grayscale value is MaxGray and the grayscale value is Gray, the luminance for the grayscale value GrayL may be determined by following Equation 7.

$$GrayL=(Gray/MaxGray)^{gm}*MaxL \quad \text{Equation 7}$$

FIG. 9 is an example of a grayscale based flicker lookup table. In FIG. 9, the flicker lookup table may have a flicker value of 0 for the grayscale values of 0 and 1. Herein the flicker value of 0 may represent the driving frequency of 1 Hz. In FIG. 9, the flicker lookup table may have a flicker value of 1 for the grayscale values of 2 and 3. Herein the flicker value of 1 may represent the driving frequency of 30 Hz. In FIG. 9, the flicker lookup table may have a flicker value of 2 for the grayscale value of 4. Herein the flicker value of 2 may represent the driving frequency of 10 Hz. In FIG. 9, the flicker lookup table may have a flicker value of 3 for the grayscale value of 5. Herein the flicker value of 3 may represent the driving frequency of 2 Hz.

The flicker lookup table 260B in FIG. 10 may store a grayscale luminance corresponding to the grayscale value of the input image data IMG and the flicker value for determining the driving frequency of the display panel 100 corresponding to the grayscale luminance.

FIG. 10 is an example of a luminance based flicker lookup table 260B. In FIG. 10, the flicker lookup table 260B may have a flicker value of 0 for the grayscale luminances of 0.03 and 0.22. In FIG. 10, the flicker lookup table may have a flicker value of 1 for the grayscale luminances of 0.59 and 1.18. In FIG. 10, the flicker lookup table may have a flicker value of 2 for the grayscale luminance of 1.98. In FIG. 10, the flicker lookup table may have a flicker value of 3 for the grayscale luminance of 3.02.

When the luminance setting value DBV inputted from the host 700 is varied, the luminance based flicker lookup table 260B may be updated in real time based on the flicker values according to the luminance which are stored in the driving controller 200.

According to some example embodiments, the driving frequency determiner 240 may convert the grayscale value of the input image data IMG into the grayscale luminance, extract the flicker value corresponding to the grayscale luminance from the flicker lookup table 260B and determine the driving frequency based on the flicker value.

According to some example embodiments, the driving controller 200 converts the flicker lookup table 260B according to the luminance setting value DBV. Thus, the driving controller 200 may determine the driving frequency of the display panel 100 based on the grayscale value of the input image data IMG and the luminance setting value DBV. Thus, the flicker of the display panel 100 may be prevented or reduced in the low frequency driving mode so that the display quality of the display panel 100 may be enhanced.

Figure 11:
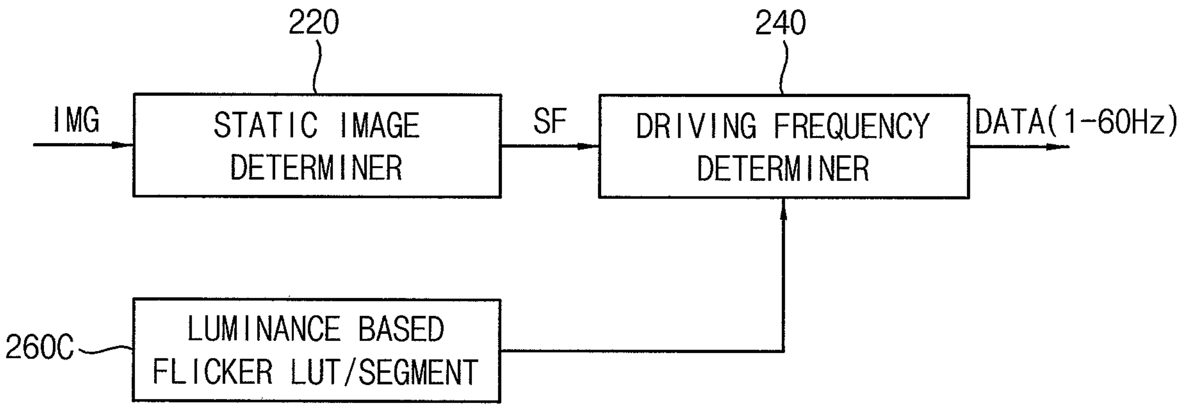
FIG. 11 is a block diagram illustrating a driving controller of a display apparatus according to some example embodiments of the present inventive concept.

FIG. 11 is a block diagram illustrating a driving controller of a display apparatus according to some example embodiments of the present inventive concept.

The display apparatus and the method of driving the display apparatus according to the present example embodiment is substantially the same as the display apparatus and the method of driving the display apparatus of the previous example embodiment explained referring to FIGS. 7 to 10 except that the display panel is divided into a plurality of segments. Thus, the same reference numerals will be used to refer to the same or like parts as those described in the previous example embodiment of FIGS. 7 to 10 and some repetitive explanation concerning the above elements may be omitted.

Referring to FIGS. 1, 5 and 8 to 11, the display apparatus includes a display panel 100 and a display panel driver. The display panel driver includes a driving controller 200, a gate driver 300, a gamma reference voltage generator 400 and a data driver 500. The display apparatus may further include a host 700.

The host 700 outputs the input image data IMG and the input control signal CONT to the driving controller 200. The host 700 outputs a luminance setting value DBV representing luminance information of the display panel 100. The luminance setting value DBV may be automatically determined according to an ambient luminance of the display apparatus or set by a user. Alternatively, the luminance setting value DBV may be a dimming information determined based on the input image data IMG. For example, the luminance setting value DBV may represent a maximum luminance of an image displayed on the display panel 100.

The display panel 100 may include a plurality of segments SEG11 to SEG55. Although the display panel 100 includes the segments in five rows and five columns in the present example embodiment, the present inventive concept is not limited thereto.

When the flicker value is determined for a unit of the pixel and only one pixel has a high flicker value, the entire display panel may be driven in a high driving frequency to prevent or reduce the flicker in the one pixel. For example, when a flicker of only one pixel is prevented or reduced in the driving frequency of 30 Hz and the other pixels do not generate the flicker in the driving frequency of 1 Hz, the display panel 100 may be driven in the driving frequency of 30 Hz and the power consumption of the display apparatus may be higher than necessary.

Thus, when the display panel 100 is divided into the segments and the flicker index is determined for a unit of the segment, the power consumption of the display apparatus may be effectively reduced.

The driving controller 200 may determine the driving frequency of the display panel 100 using flicker information varied according to the grayscale value of the input image data IMG and the luminance setting value DBV.

The driving controller 200 may determine optimal driving frequencies for the segments and may determine the maximum driving frequency among the optimal driving frequencies for the segments as the driving frequency of the display panel 100.

For example, when an optimal driving frequency for a first segment SEG11 is 10 Hz and optimal driving frequencies for the other segments SEG12 to SEG55 except for the first segment SEG11 are 2 Hz, the driving controller 200 may determine the low driving frequency to 10 Hz.

The driving controller 200 may include a static image determiner 220, a driving frequency determiner 240 and a flicker lookup table 260C. According to some example embodiments, the flicker lookup table 260C may store a grayscale luminance corresponding to the grayscale value of the input image data IMG and the flicker value for determining the driving frequency of the display panel 100 corresponding to the grayscale luminance.

The driving frequency determiner 240 may refer the flicker lookup table 260C and segment information to determine the low driving frequency.

When the luminance setting value DBV inputted from the host 700 is varied, the luminance based flicker lookup table 260C may be updated in real time based on the flicker values according to the luminance which are stored in the driving controller 200.

According to some example embodiments, the driving frequency determiner 240 may convert the grayscale value of the input image data IMG into the grayscale luminance, extract the flicker value corresponding to the grayscale luminance from the flicker lookup table 260C and determine the driving frequency based on the flicker value.

According to some example embodiments, the driving controller 200 converts the flicker lookup table 260C according to the luminance setting value DBV. Thus, the driving controller 200 may determine the driving frequency of the display panel 100 based on the grayscale value of the input image data IMG and the luminance setting value DBV. Thus, the flicker of the display panel 100 may be prevented or reduced in the low frequency driving mode so that the display quality of the display panel 100 may be enhanced.

Figure 12:
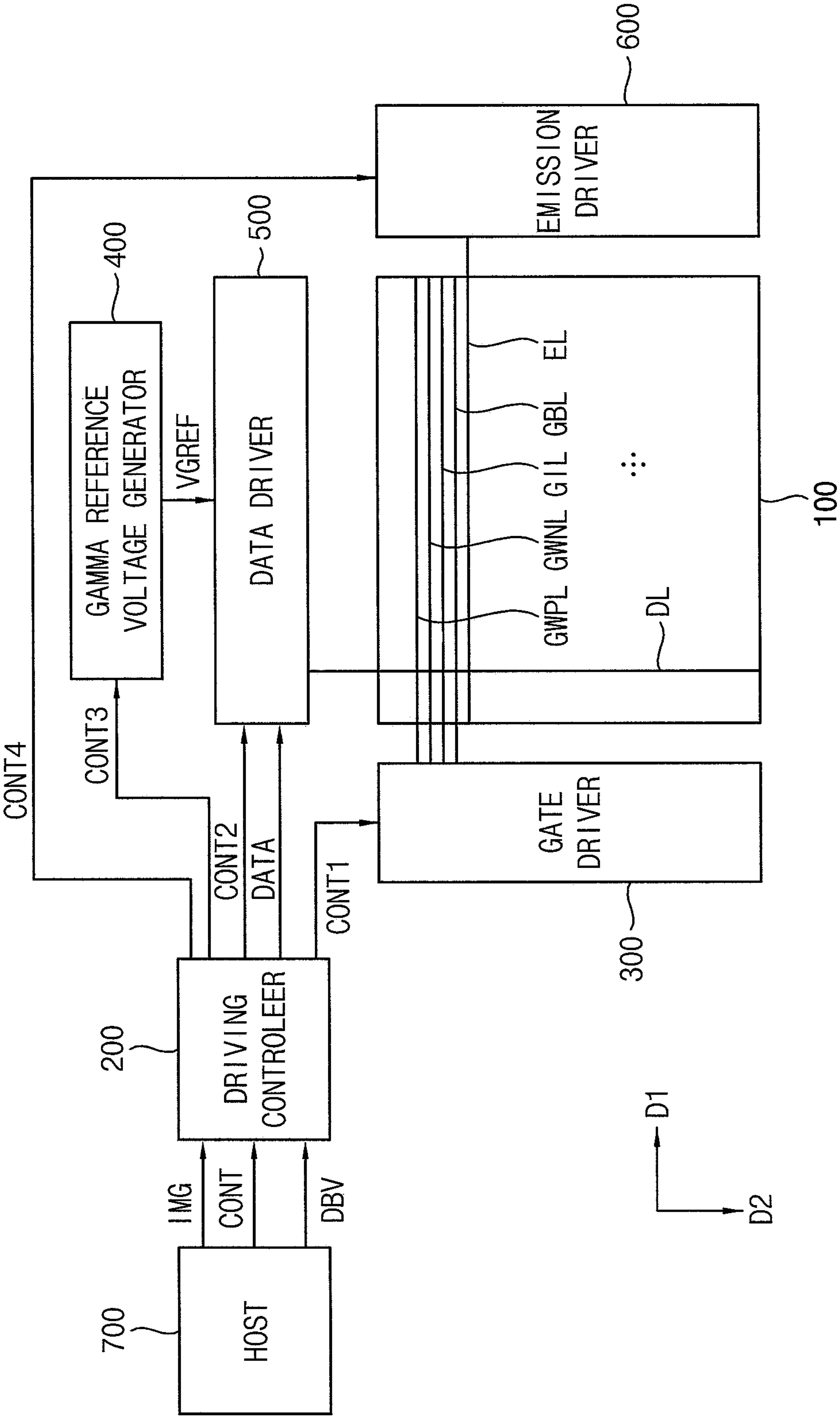
FIG. 12 is a block diagram illustrating a display apparatus according to some example embodiments of the present inventive concept.
Figure 13:
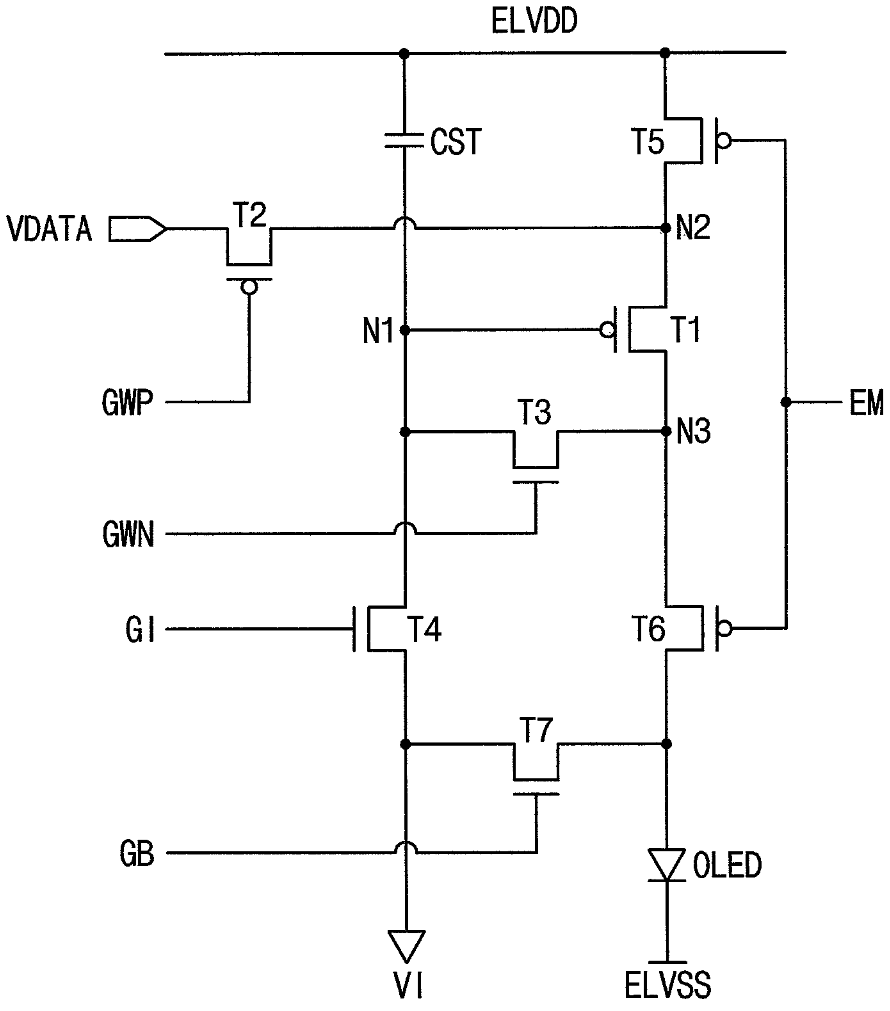
FIG. 13 is a circuit diagram illustrating a pixel of a display panel of FIG. 12.
Figure 14:
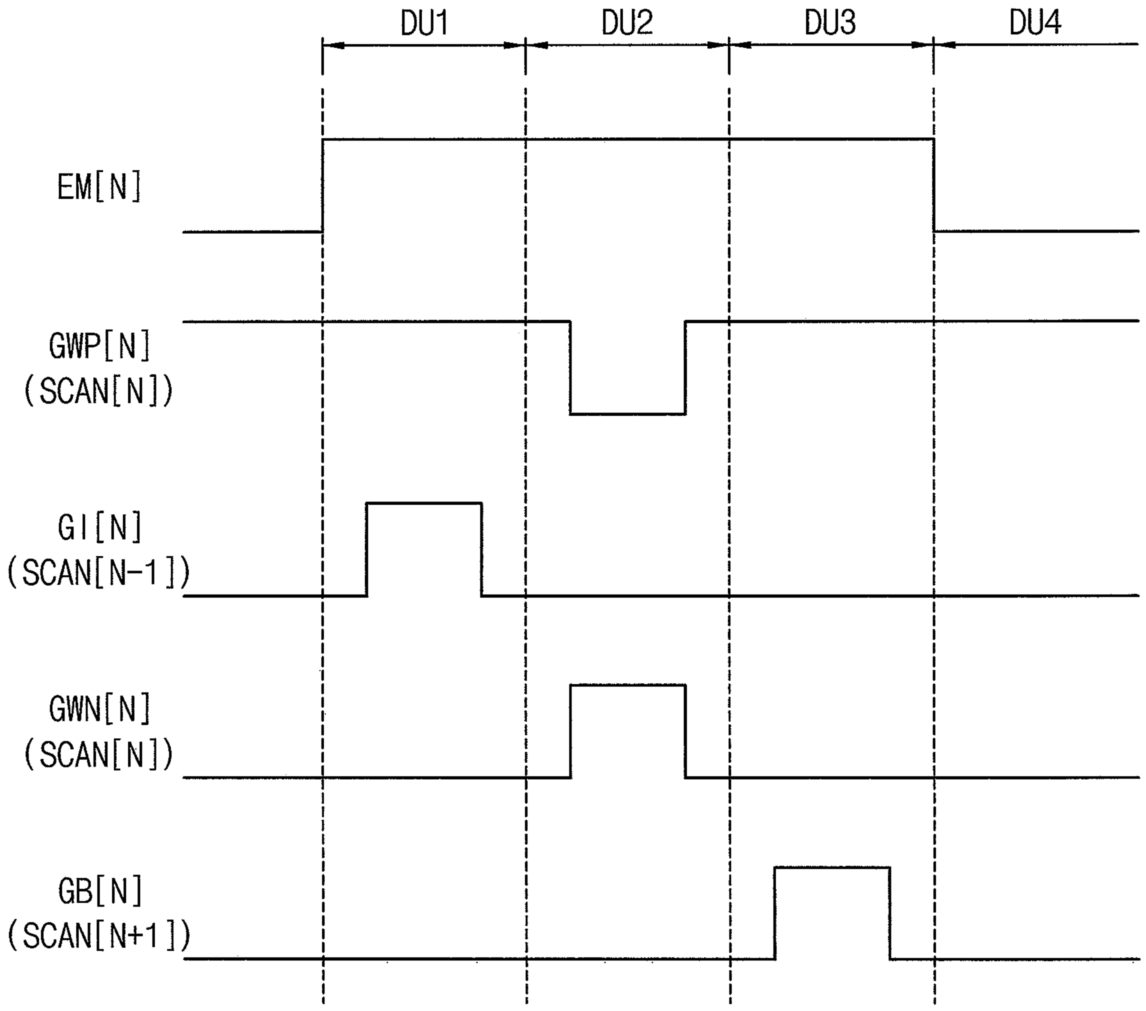
FIG. 14 is a timing diagram illustrating signals applied to the pixel of the display panel of FIG. 13.
Figure 15:
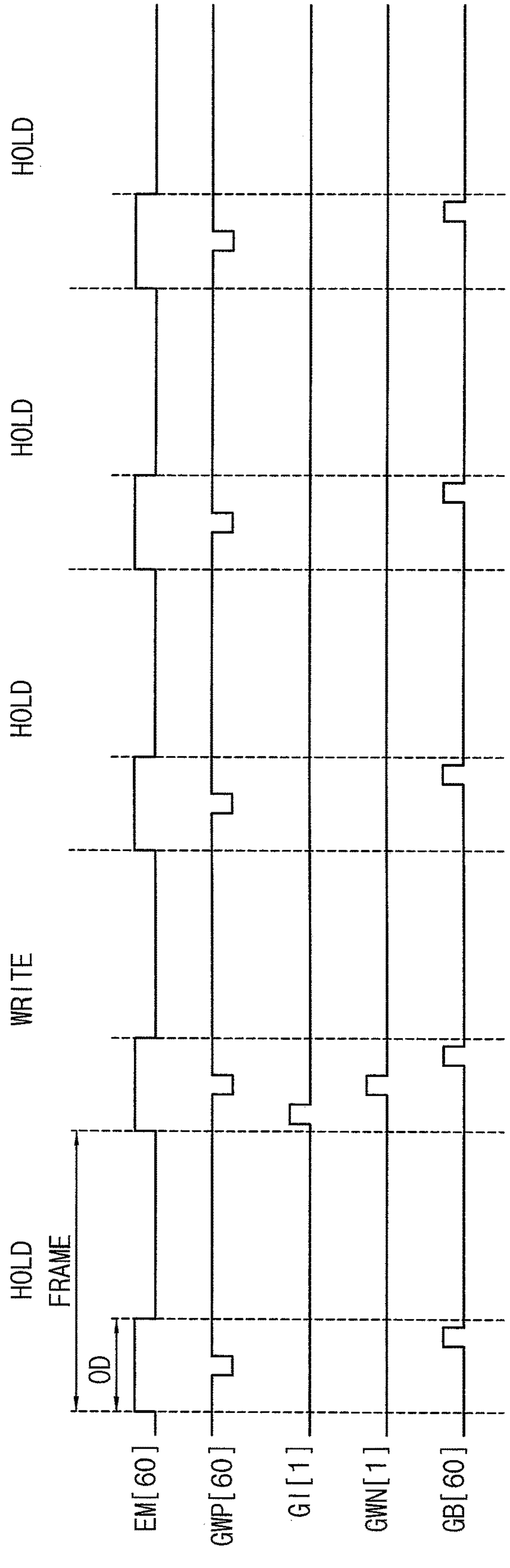
FIG. 15 is a timing diagram illustrating signals applied to the pixel of the display panel of FIG. 13 in a low frequency driving mode.

FIG. 12 is a block diagram illustrating a display apparatus according to some example embodiments of the present inventive concept. FIG. 13 is a circuit diagram illustrating a pixel of a display panel of FIG. 12. FIG. 14 is a timing diagram illustrating signals applied to the pixel of the display panel of FIG. 13. FIG. 15 is a timing diagram illustrating signals applied to the pixel of the display panel of FIG. 13 in a low frequency driving mode.

The display apparatus and the method of driving the display apparatus according to the present example embodiment is substantially the same as the display apparatus and the method of driving the display apparatus of the previous example embodiment explained referring to FIGS. 1 to 4 except for the structures of the display panel and the emission driver. Thus, the same reference numerals will be used to refer to the same or like parts as those described in the previous example embodiment of FIGS. 1 to 4 and some repetitive explanation concerning the above elements may be omitted.

Referring to FIGS. 2 to 4 and 12 to 15, the display apparatus includes a display panel 100 and a display panel driver. The display panel driver includes a driving controller 200, a gate driver 300, a gamma reference voltage generator 400 and a data driver 500. The display apparatus may further include an emission driver 600. The display apparatus may further include a host 700.

The display panel 100 includes a plurality of gate lines GWPL, GWNL, GIL and GBL, a plurality of data lines DL, a plurality of emission lines EL and a plurality of pixels electrically connected to the gate lines GWPL, GWNL, GIL and GBL, the data lines DL and the emission lines EL. The gate lines GWPL, GWNL, GIL and GBL may extend in a first direction D1, the data lines DL may extend in a second direction D2 crossing the first direction D1 and the emission lines EL may extend in the first direction D1.

The driving controller 200 generates a first control signal CONT1, a second control signal CONT2, a third control signal CONT3, a fourth control signal CONT4 and a data signal DATA based on the input image data IMG and the input control signal CONT.

The emission driver 600 generates emission signals to drive the emission lines EL in response to the fourth control signal CONT4 received from the driving controller 200. The emission driver 600 may output the emission signals to the emission lines EL.

The host 700 outputs the input image data IMG and the input control signal CONT to the driving controller 200. The host 700 outputs a luminance setting value DBV representing luminance information of the display panel 100. The luminance setting value DBV may be automatically determined according to an ambient luminance of the display apparatus or set by a user. Alternatively, the luminance setting value DBV may be a dimming information determined based on the input image data IMG. For example, the luminance setting value DBV may represent a maximum luminance of an image displayed on the display panel 100.

The display panel 100 includes the plurality of the pixels. Each pixel includes an organic light emitting element OLED.

The pixel receives a data write gate signal GWP and GWN, a data initialization gate signal GI, an organic light emitting element initialization signal GB, the data voltage VDATA and the emission signal EM and the organic light emitting element OLED of the pixel emits light corresponding to the level of the data voltage VDATA to display the image.

According to some example embodiments, the pixel may include a switching element of a first type and a switching element of a second type different from the first type. For example, the switching element of the first type may be a polysilicon thin film transistor. For example, the switching element of the first type may be a low temperature polysilicon (LTPS) thin film transistor. For example, the switching element of the second type may be an oxide thin film transistor. For example, the switching element of the first type may be a P-type transistor and the switching element of the second type may be an N-type transistor.

For example, the data write gate signal may include a first data write gate signal GWP and a second data write gate signal GWN. The first data write gate signal GWP may be applied to the P-type transistor so that the first data write gate signal GWP has an activation signal of a low level corresponding to a data writing timing. The second data write gate signal GWN may be applied to the N-type transistor so that the second data write gate signal GWN has an activation signal of a high level corresponding to the data writing timing.

At least one of the pixels may include first to seventh pixel switching elements T1 to T7, a storage capacitor CST and the organic light emitting element OLED.

The first pixel switching element T1 includes a control electrode connected to a first node N1, an input electrode connected to a second node N2 and an output electrode connected to a third node N3. For example, the first pixel switching element T1 may be the polysilicon thin film transistor. For example, the first pixel switching element T1 may be the P-type thin film transistor.

The second pixel switching element T2 includes a control electrode to which the first data write gate signal GWP is applied, an input electrode to which the data voltage VDATA is applied and an output electrode connected to the second node N2. For example, the second pixel switching element T2 may be the polysilicon thin film transistor. For example, the second pixel switching element T2 may be the P-type thin film transistor.

The third pixel switching element T3 includes a control electrode to which the second data write gate signal GWN is applied, an input electrode connected to the first node N1 and an output electrode connected to the third node N3. For example, the third pixel switching element T3 may be the oxide thin film transistor. For example, the third pixel switching element T3 may be the N-type thin film transistor.

The fourth pixel switching element T4 includes a control electrode to which the data initialization gate signal GI is applied, an input electrode to which an initialization voltage VI is applied and an output electrode connected to the first node N1. For example, the fourth pixel switching element T4 may be the oxide thin film transistor. For example, the fourth pixel switching element T4 may be the N-type thin film transistor.

The fifth pixel switching element T5 includes a control electrode to which the emission signal EM is applied, an input electrode to which a high power voltage ELVDD is applied and an output electrode connected to the second node N2. For example, the fifth pixel switching element T5 may be the polysilicon thin film transistor. For example, the fifth pixel switching element T5 may be the P-type thin film transistor.

The sixth pixel switching element T6 includes a control electrode to which the emission signal EM is applied, an input electrode connected to the third node N3 and an output electrode connected to an anode electrode of the organic light emitting element OLED. For example, the sixth pixel switching element T6 may be the polysilicon thin film transistor. For example, the sixth pixel switching element T6 may be a P-type thin film transistor. The control electrode of the sixth pixel switching element T6 may be a gate electrode, the input electrode of the sixth pixel switching element T6 may be a source electrode and the output electrode of the sixth pixel switching element T6 may be a drain electrode.

The seventh pixel switching element T7 includes a control electrode to which the organic light emitting element initialization gate signal GB is applied, an input electrode to which the initialization voltage VI is applied and an output electrode connected to the anode electrode of the organic light emitting element OLED. For example, the seventh pixel switching element T7 may be the oxide thin film transistor. For example, the seventh pixel switching element T7 may be the N-type thin film transistor. Alternatively, the seventh pixel switching element T7 may be the polysilicon thin film transistor. For example, the seventh pixel switching element T7 may be a P-type thin film transistor. When the seventh pixel switching element T7 is the P-type thin film transistor, the organic light emitting element initialization gate signal GB may have an activation signal of a low level unlike FIGS. 14 and 15.

The storage capacitor CST includes a first electrode to which the high power voltage ELVDD is applied and a second electrode connected to the first node N1.

The organic light emitting element OLED includes the anode electrode and a cathode electrode to which a low power voltage ELVSS is applied.

In FIG. 14, during a first duration DU1, the first node N1 and the storage capacitor CST are initialized in response to the data initialization gate signal GI. During a second duration DU2, a threshold voltage |VTH| of the first pixel switching element T1 is compensated and the data voltage VDATA of which the threshold voltage |VTH| is compensated is written to the first node N1 in response to the first and second data write gate signals GWP and GWN. During a third duration DU3, the anode electrode of the organic light emitting element OLED is initialized in response to the organic light emitting element initialization gate signal GB. During a fourth duration DU4, the organic light emitting element OLED emit the light in response to the emission signal EM so that the display panel 100 displays the image.

During the first duration DU1, the data initialization gate signal GI may have an active level. For example, the active level of the data initialization gate signal GI may be a high level. When the data initialization gate signal GI has the active level, the fourth pixel switching element T4 is turned on so that the initialization voltage VI may be applied to the first node N1. The data initialization gate signal GI[N] of a present stage may be generated based on a scan signal SCAN[N−1] of a previous stage.

During the second duration DU2, the first data write gate signal GWP and the second data write gate signal GWN may have an active level. For example, the active level of the first data write gate signal GWP may be a low level and the active level of the second data write gate signal GWN may be a high level. When the first data write gate signal GWP and the second data writhe gate signal GWN have the active level, the second pixel switching element T2 and the third pixel switching element T3 are turned on. In addition, the first pixel switching element T1 is turned on in response to the initialization voltage VI. The first data write gate signal GWP[N] of the present stage may be generated based on a scan signal SCAN[N] of the present stage. The second data write gate signal GWN[N] of the present stage may be generated based on the scan signal SCAN[N] of the present stage.

A voltage which is subtraction an absolute value |VTH| of the threshold voltage of the first pixel switching element T1 from the data voltage VDATA may be charged at the first node N1 along a path generated by the first to third pixel switching elements T1, T2 and T3.

During the third duration DU3, the organic light emitting element initialization signal GB may have an active level. For example, the active level of the organic light emitting element initialization signal GB may be a high level. When the organic light emitting element initialization signal GB has the active level, the seventh pixel switching element T7 is turned on so that the initialization voltage VI may be applied to the anode electrode of the organic light emitting element OLED. The organic light emitting element initialization signal GB[N] of the present stage may be generated based on a scan signal SCAN[N+1] of a next stage.

During the fourth duration DU4, the emission signal EM may have an active level. The active level of the emission signal EM may be a low level. When the emission signal EM has the active level, the fifth pixel switching element T5 and the sixth pixel switching element T6 are turned on. In addition, the first pixel switching element T1 is turned on by the data voltage VDATA.

A driving current flows through the fifth pixel switching element T5, the first pixel switching element T1 and the sixth pixel switching element T6 to drive the organic light emitting element OLED. An intensity of the driving current may be determined by the level of the data voltage VDATA. A luminance of the organic light emitting element OLED is determined by the intensity of the driving current. The driving current ISD flowing through a path from the input electrode to the output electrode of the first pixel switching element T1 is determined as following Equation 8.

$$ISD = \frac{1}{2}\mu Cox\frac{W}{L}(VSG - |VTH|)^2 \quad \text{Equation 8}$$

In Equation 8, μ is a mobility of the first pixel switching element T1. Cox is a capacitance per unit area of the first pixel switching element T1. W/L is a width to length ratio of the first pixel switching element T1. VSG is a voltage between the input electrode N2 of the first pixel switching element T1 and the control node N1 of the first pixel switching element T1. |VTH| is the threshold voltage of the first pixel switching element T1.

The voltage VG of the first node N1 after the compensation of the threshold voltage |VTH| during the second duration DU2 may be represented as following Equation 9.

$$VG = VDATA - |VTH| \quad \text{Equation 9}$$

When the organic light emitting element OLED emits the light during the fourth duration DU4, the driving voltage VOV and the driving current ISD may be represented as following Equations 10 and 11. In Equation 10, VS is a voltage of the second node N2.

$$VOV = VS - VG - |VTH| = ELVDD - (VDATA - |VTH|) - |VTH| = ELVDD - VDATA \quad \text{Equation 10}$$

$$ISD = \frac{1}{2}\mu Cox\frac{W}{L}(ELVDD - VDATA)^2 \quad \text{Equation 11}$$

The threshold voltage |VTH| is compensated during the second duration DU2, so that the driving current ISD may be determined regardless of the threshold voltage |VTH| of the first pixel switching element T1 when the organic light emitting element OLED emits the light during the fourth duration DU4.

According to some example embodiments, when the image displayed on the display panel 100 is a static image or the display panel is operated in Always On Mode, a driving frequency of the display panel 100 may be decreased to reduce a power consumption. When all of the switching elements of the pixel of the display panel 100 are polysilicon thin film transistor, a flicker may be generated due to a leakage current of the pixel switching element in the low frequency driving mode. Thus, some of the pixel switching elements may be designed using the oxide thin film transistors. According to some example embodiments, the third pixel switching element T3, the fourth pixel switching element T4 and the seventh pixel switching element T7 may be the oxide thin film transistors. The first pixel switching element T1, the second pixel switching element T2, the fifth pixel switching element T5 and the sixth pixel switching element T6 may be the polysilicon thin film transistors.

The display panel 100 may be driven in a normal driving mode in which the display panel 100 is driven in a normal driving frequency and in a low frequency driving mode in which the display panel 100 is driven in a frequency less than the normal driving frequency.

For example, when the input image data represent a video image, the display panel 100 may be driven in the normal driving mode. For example, when the input image data represent a static image, the display panel may be driven in the low frequency driving mode. For example, when the display apparatus is operated in the always on mode, the display panel may be driven in the low frequency driving mode.

The display panel 100 may be driven in a unit of frame. The display panel 100 may be refreshed in every frame in the normal driving mode. Thus, the normal driving mode includes only writing frames in which the data is written in the pixel.

The display panel 100 may be refreshed in the frequency of the low frequency driving mode in the low frequency driving mode. Thus, the low frequency driving mode includes the writing frames in which the data is written in the pixel and holding frames in which the written data is maintained without writing the data in the pixel.

For example, when the frequency of the normal driving mode is 60 Hz and the frequency of the low frequency driving mode is 1 Hz, the low frequency driving mode includes one writing frame WRITE and fifty nine holding frames HOLD in a second. Herein, a length of the writing frame WRITE may be substantially the same as a length of the holding frame HOLD. For example, when the frequency of the normal driving mode is 60 Hz and the frequency of the low frequency driving mode is 1 Hz, fifty nine continuous holding frames HOLD are located between two adjacent writing frames WRITE.

For example, when the frequency of the normal driving mode is 60 Hz and the frequency of the low frequency driving mode is 10 Hz, the low frequency driving mode includes ten writing frame WRITE and fifty holding frames HOLD in a second. Herein, a length of the writing frame WRITE may be substantially the same as a length of the holding frame HOLD. For example, when the frequency of the normal driving mode is 60 Hz and the frequency of the low frequency driving mode is 10 Hz, five continuous holding frames HOLD are located between two adjacent writing frames WRITE.

According to some example embodiments, the second data write gate signal GWN and the data initialization gate signal GI may have a first frequency in the low frequency driving mode. The first frequency may be the frequency of the low frequency driving mode. In contrast, the first data write gate signal GWP, the emission signal EM and the organic light emitting element initialization gate signal GB may have a second frequency greater than the first frequency. The second frequency may be the normal frequency of the normal driving mode. In FIG. 15, for example, the first frequency is 1 Hz and the second frequency is 60 Hz.

The emission signal EM in the frame may include an emission off duration OD when the emission signal EM has the inactive level and an emission on duration when the emission signal EM has the active level.

The driving controller 200 may determine the driving frequency of the display panel 100 using flicker information varied according to the grayscale value of the input image data IMG and the luminance setting value DBV.

As shown in FIG. 2, the driving controller 200 may include a static image determiner 220, a driving frequency determiner 240 and a flicker lookup table 260. The driving controller 200 may further include a luminance determiner 270 and a flicker lookup table converter 280.

The luminance determiner 270 may determine whether or not the luminance setting value DBV is equal to a default luminance setting value. The flicker lookup table 260 may mean a flicker lookup table set for the default luminance setting value of the display apparatus.

When the luminance setting value DBV received from the host 700 is equal to the default luminance setting value, the flicker lookup table 260 is not required to be changed so that the driving frequency of the display panel 100 may be determined using the flicker lookup table 260.

In contrast, when the luminance setting value DBV received from the host 700 is different from the default luminance setting value, the flicker lookup table converter 280 converts the flicker lookup table 260 and generates a converted flicker lookup table CFLUT.

When the flicker lookup table 260 is converted into the converted flicker lookup table CFLUT, the driving frequency determiner 240 may determine the driving frequency of the display panel 100 using the converted flicker lookup table CFLUT.

The method of determining the driving frequency explained referring to FIGS. 5 and 6 may be applied to the display panel of the present example embodiment. In addition, the method of determining the driving frequency explained referring to FIGS. 7 to 10 may be applied to the display panel of the present example embodiment. In addition, the method of determining the driving frequency explained referring to FIG. 11 may be applied to the display panel of the present example embodiment.

According to some example embodiments, the driving controller 200 determines the driving frequency of the switching element of the first type to a first driving frequency (e.g. the normal driving frequency) and the driving frequency of the switching element of the second type to a second driving frequency (e.g. the low driving frequency) less than the first driving frequency in the low frequency driving mode.

The driving controller 200 determines the driving frequency of the switching element of the first type to the first driving frequency (e.g. the normal driving frequency) and the driving frequency of the switching element of the second type to the first driving frequency (e.g. the normal driving frequency) in the normal driving mode.

According to some example embodiments, the driving controller 200 converts the flicker lookup table 260 according to the luminance setting value DBV. Thus, the driving controller 200 may determine the driving frequency of the display panel 100 based on the grayscale value of the input image data IMG and the luminance setting value DBV. Thus, the flicker of the display panel 100 may be prevented or reduced in the low frequency driving mode so that the display quality of the display panel 100 may be enhanced.

According to some example embodiments of the display apparatus and the method of driving the display apparatus, the display quality in the low frequency driving mode may be enhanced.

The foregoing is illustrative of the present inventive concept and is not to be construed as limiting thereof. Although a few example embodiments of the present inventive concept have been described, those skilled in the art will readily appreciate that many modifications are possible in the example embodiments without materially departing from the novel teachings and advantages of the present inventive concept. Accordingly, all such modifications are intended to be included within the scope of the present inventive concept as defined in the claims. In the claims, means-plus-function clauses are intended to cover the structures described herein as performing the recited function and not only structural equivalents but also equivalent structures. Therefore, it is to be understood that the foregoing is illustrative of the present inventive concept and is not to be construed as limited to the specific example embodiments disclosed, and that modifications to the disclosed example embodiments, as well as other example embodiments, are intended to be included within the scope of the appended claims. The present inventive concept is defined by the following claims, with equivalents of the claims to be included therein.

What is claimed is:

1. A display apparatus comprising:

a display panel configured to display an image based on input image data;

a gate driver configured to output a gate signal to the display panel;

a data driver configured to output a data voltage to the display panel; and a driving controller configured to control an operation of the gate driver and an operation of the data driver, to determine a driving mode of the display apparatus to one of a normal driving mode and a low frequency driving mode based on the input image data, and to determine a driving frequency of the display panel based on the input image data, wherein the driving controller is configured to determine the driving frequency of the display panel using a flicker value varied according to a grayscale value of the input image data corresponding to an image that is going to be displayed and a luminance setting value that represents a user-changed setting of a maximum luminance of the input image data displayed on the display panel.

2. The display apparatus of claim 1, wherein the driving controller comprises:

a static image determiner configured to determine whether the input image data is a static image or a video image, and to generate a flag representing whether the input image data is the static image or the video image;

a flicker lookup table configured to store the flicker value; and a driving frequency determiner configured to determine the normal driving mode and the low frequency driving mode based on the flag and to determine the driving frequency of the display panel using the flicker lookup table.

3. The display apparatus of claim 2, wherein the flicker lookup table is configured to store the grayscale value of the input image data and the flicker value for determining the driving frequency of the display panel and corresponding to the grayscale value.

4. The display apparatus of claim 3, wherein the driving controller further comprises:

a luminance determiner configured to determine whether or not the luminance setting value is equal to a default luminance setting value; and a flicker lookup table converter configured to convert the flicker lookup table when the luminance setting value is different from the default luminance setting value.

5. The display apparatus of claim 4, wherein the flicker lookup table converter is configured to determine first boundary grayscale values where the flicker value changes, to determine first boundary luminances corresponding to the first boundary grayscale values for the default luminance setting value, and to determine second boundary grayscale values converted from the first boundary grayscale values according to a ratio between the default luminance setting value and the luminance setting value to generate a converted flicker lookup table which is converted from the flicker lookup table.

6. The display apparatus of claim 5, wherein in response to a second boundary grayscale value being ng, a first boundary luminance is ol, the luminance setting value is ml, a maximum grayscale value is mg and a gamma value is gm, $ol=(ng/mg)^{gm}*ml$.

7. The display apparatus of claim 4, wherein the display panel includes a plurality of segments, and wherein the driving controller is configured to determine optimal driving frequencies for the segments and to determine a maximum driving frequency among the optimal driving frequencies for the segments as the driving frequency of the display panel.

8. The display apparatus of claim 2, wherein the flicker lookup table is configured to store a grayscale luminance corresponding to the grayscale value of the input image data and the flicker value for determining the driving frequency of the display panel and corresponding to the grayscale luminance.

9. The display apparatus of claim 8, wherein the driving frequency determiner is configured to convert the grayscale value of the input image data into the grayscale luminance and to extract the flicker value corresponding to the grayscale luminance from the flicker lookup table to determine the driving frequency.

10. The display apparatus of claim 9, wherein the display panel includes a plurality of segments, and wherein the driving controller is configured to determine optimal driving frequencies for the segments and to determine a maximum driving frequency among the optimal driving frequencies for the segments as the driving frequency of the display panel.

11. The display apparatus of claim 1, further comprising a host configured to output the input image data and the luminance setting value to the driving controller.

12. The display apparatus of claim 11, wherein the driving controller is configured to determine the driving mode of the display apparatus to be the normal driving mode in response to the driving controller not receiving the luminance setting value from the host.

13. The display apparatus of claim 1, wherein the display panel comprises a switching element of a first type and a switching element of a second type different from the first type.

14. The display apparatus of claim 13, wherein the driving controller is configured to determine a driving frequency of the switching element of the first type to a first driving frequency and a driving frequency of the switching element of the second type to a second driving frequency less than the first driving frequency in the low frequency driving mode, and wherein the driving controller is configured to determine the driving frequency of the switching element of the first type to the first driving frequency and the driving frequency of the switching element of the second type to the first driving frequency in the normal driving mode.

15. The display apparatus of claim 13, wherein the switching element of the first type is a polysilicon thin film transistor and a P-type transistor, and wherein the switching element of the second type is an oxide thin film transistor and an N-type transistor.

16. A method of driving a display apparatus, the method comprising:

determining a driving mode of the display apparatus to one of a normal driving mode and a low frequency driving mode based on input image data;

determining a driving frequency of a display panel using a flicker value varied according to a grayscale value of the input image data corresponding to an image that is going to be displayed and a luminance setting value;

outputting a gate signal to the display panel; and outputting a data voltage to the display panel, wherein the luminance setting value represents a user-changed setting of a maximum luminance of the input image data displayed on the display panel.

17. The method of claim 16, wherein determining the driving frequency of the display panel comprises:

determining whether or not the luminance setting value is equal to a default luminance setting value; and converting a flicker lookup table configured to store the flicker value when the luminance setting value is different from the default luminance setting value.

18. The method of claim 17, wherein converting the flicker lookup table comprises:

determining first boundary grayscale values where the flicker value changes;

determining first boundary luminances corresponding to the first boundary grayscale values for the default luminance setting value; and determining second boundary grayscale values converted from the first boundary grayscale values according to a ratio between the default luminance setting value and the luminance setting value to generate a converted flicker lookup table which is converted from the flicker lookup table.

19. The method of claim 16, wherein a flicker lookup table is configured to store a grayscale luminance corresponding to the grayscale value of the input image data and the flicker value for determining the driving frequency of the display panel and corresponding to the grayscale luminance, and wherein determining the driving frequency of the display panel comprises converting the grayscale value of the input image data into the grayscale luminance and extracting the flicker value corresponding to the grayscale luminance from the flicker lookup table to determine the driving frequency.

* * * * *